US012314294B1

(12) United States Patent
Browder et al.

(10) Patent No.: US 12,314,294 B1
(45) Date of Patent: May 27, 2025

(54) METHOD AND SYSTEMS FOR GENERATING A PROJECTION STRUCTURE USING A GRAPHICAL USER INTERFACE

(71) Applicant: Signet Health Corporation, North Richland Hills, TX (US)

(72) Inventors: Blake Browder, Dallas, TX (US); Joy Figarsky, Little Rock, AR (US)

(73) Assignee: Signet Health Corporation, North Richland Hills, TX (US)

( * ) Notice: Subject to any disclaimer, the term of this patent is extended or adjusted under 35 U.S.C. 154(b) by 0 days.

(21) Appl. No.: 18/957,779

(22) Filed: Nov. 24, 2024

(51) Int. Cl.

| | |
|---|---|
| ***G06F 16/00*** | (2019.01) |
| ***G06F 16/31*** | (2019.01) |
| ***G06F 16/3329*** | (2025.01) |
| ***G06F 16/35*** | (2019.01) |
| ***G06T 11/20*** | (2006.01) |

(52) U.S. Cl.
CPC ........ *G06F 16/33295* (2025.01); *G06F 16/31* (2019.01); *G06F 16/35* (2019.01); *G06T 11/206* (2013.01)

(58) Field of Classification Search
None
See application file for complete search history.

(56) References Cited

U.S. PATENT DOCUMENTS 8,666,771 B2 3/2014 Roesch et al.
10,922,633 B2 2/2021 Ulizio et al.
11,461,723 B2 10/2022 Balan
12,111,858 B1 * 10/2024 Radhakrishnan ....... G06F 16/31
12,141,732 B1 * 11/2024 Solmer ................ G06Q 10/067
2004/0243438 A1 12/2004 Mintz
2023/0008936 A1 1/2023 Adhikari et al.
2024/0320247 A1 * 9/2024 Chen .................. G06F 16/3329
2024/0320251 A1 * 9/2024 Hemington ........... G06F 16/338

FOREIGN PATENT DOCUMENTS

IN 202441067899 A 9/2024

* cited by examiner

*Primary Examiner* — Anhtai V Tran

(74) *Attorney, Agent, or Firm* — Caldwell Intellectual Property Law

(57) ABSTRACT

A system for generating a projection structure using a graphical user interface, wherein the system comprises: a display device configured to display a graphical user interface (GUI); a computing device comprising a memory; and a processor, wherein the memory contains instructions configuring the processor to: receive a plurality of datasets, wherein each dataset comprises a plurality of parameters; generate a first projection structure as a function of the datasets; display the first projection structure through the GUI; receive natural language query data corresponding to the first projection structure using a chatbot interface; generate response data as a function of the query data; map, as a function of a look-up table, each categorization to a database entry index; obtain response data from the database; adjust the parameters as a function of the response data; generate a second projection structure; and display it in the GUI.

20 Claims, 9 Drawing Sheets

700

Receiving, Using The At Least A Processor, A Plurality Of Datasets, Wherein Each Dataset Of The Plurality Of Datasets Comprises A Corresponding Plurality Of Parameters — 705

Generating, Using The At Least A Processor, A First Projection Structure As A Function Of The Plurality Of Datasets — 710

Displaying, Through The Display Device, The First Projection Structure Through The Graphical User Interface — 715

Receiving, Through The Graphical User Interface, Natural Language Query Data Corresponding To The First Projection Structure Using A Chatbot Interface Presented Through The Graphical User Interface — 720

Generating, Using The At Least A Processor, Response Data As A Function Of The Natural Language Query Data — 725

Generating, Using The At Least A Processor, Adjusted Plurality Of Parameters As A Function Of The Response Data — 730

Generating, Using The At Least A Processor, A Second Projection Structure As A Function Of The Response Data And The Adjusted Plurality Of Parameters — 735

Displaying, Through The Display Device, The Second Projection Structure In The Graphical User Interface — 740

METHOD AND SYSTEMS FOR GENERATING A PROJECTION STRUCTURE USING A GRAPHICAL USER INTERFACE

FIELD OF THE INVENTION

The present invention generally relates to the field of user interfaces. In particular, the present invention is directed to generating a projection structure using a graphical user interface.

BACKGROUND

Modern graphical user interfaces (GUIs) often are not adequately responsive to user input. Newer forms of user input, such as natural language input can be hard to process. Additionally, existing software may not be able to accurately respond to natural language queries without generating fabricated data.

SUMMARY OF THE DISCLOSURE

In an aspect, a system for generating a projection structure using a graphical user interface, wherein the system includes: a display device, wherein the display device is configured to display a graphical user interface (GUI); at least a computing device, wherein the computing device includes a memory; and at least a processor communicatively connected to the memory, wherein the memory contains instructions configuring the at least a processor to: receive, using the at least a processor, a plurality of datasets, wherein each dataset of the plurality of datasets includes a corresponding plurality of parameters; generate, using the at least a processor, a first projection structure as a function of the plurality of datasets; display, through the display device, the first projection structure through the graphical user interface; receive, through the graphical user interface, natural language query data corresponding to the first projection structure using a chatbot interface presented through the graphical user interface; generate, using the at least a processor, response data as a function of the natural language query data, wherein generating the response data includes processing, using a large language model, the natural language query data to determine a plurality of data categorizations; mapping, as a function of a look-up table, each of the plurality of data categorizations to a database entry index; and obtaining response data from a database as a function of each database entry index; adjusting, using the at least a processor, the plurality of parameters as a function of the response data; generate, using the at least a processor, a second projection structure as a function of the response data and the adjusted plurality of parameters; and display, through the display device, the second projection structure in the graphical user interface.

In another aspect, a method for generating a projection structure using a graphical user interface, wherein the method includes: receiving, by at least a processor, using the at least a processor, a plurality of datasets, wherein each dataset of the plurality of datasets includes a corresponding plurality of parameters; generating, using the at least a processor, a first projection structure as a function of the plurality of datasets; displaying, through a display device, the first projection structure through a graphical user interface; receiving, through the graphical user interface, natural language query data corresponding to the first projection structure using a chatbot interface presented through the graphical user interface; generating, using the at least a processor, response data as a function of the natural language query data, wherein generating the response data includes processing, using a large language model, the natural language query data to determine a plurality of data categorizations; mapping, as a function of a look-up table, each of the plurality of data categorizations to a database entry index; and obtaining response data from a database as a function of each database entry index; adjusting, using the at least a processor, the plurality of parameters as a function of the response data; generating, using the at least a processor, a second projection structure as a function of the response data and the adjusted plurality of parameters; and displaying, through the display device, the second projection structure in the graphical user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a projection structure using a graphical user interface. In an embodiment, a system for generating a projection structure using a graphical user interface, wherein the system includes: a display device, wherein the display device is configured to display a graphical user interface (GUI); at least a computing device, wherein the computing device includes a memory; and at least a processor communicatively connected to the memory, wherein the memory contains instructions configuring the at least a processor to: receive, using the at least a processor, a plurality of datasets, wherein each dataset of the plurality of datasets includes a corresponding plurality of parameters; generate, using the at least a processor, a first projection structure as a function of the plurality of datasets; display, through the display device, the first projection structure through the graphical user interface; receive, through the graphical user interface, natural language query data corresponding to the first projection structure using a chatbot interface presented through the graphical user interface; generate, using the at least a processor, response data as a function of the natural language query data, wherein generating the response data includes processing, using a large language model, the natural language query data to determine a plurality of data categorizations; mapping, as a function of a look-up table, each of the plurality of data categorizations to a database entry index; and obtaining response data from a database as a function of each database entry index; adjusting, using the at least a processor, the plurality of parameters as a function of the response data; generate, using the at least a processor, a second projection structure as a function of the response data and the adjusted plurality of parameters; and display, through the display device, the second projection structure in the graphical user interface. Exemplary embodiments illustrating aspects of the present disclosure are described below in the context of several specific examples.

Figure 1:
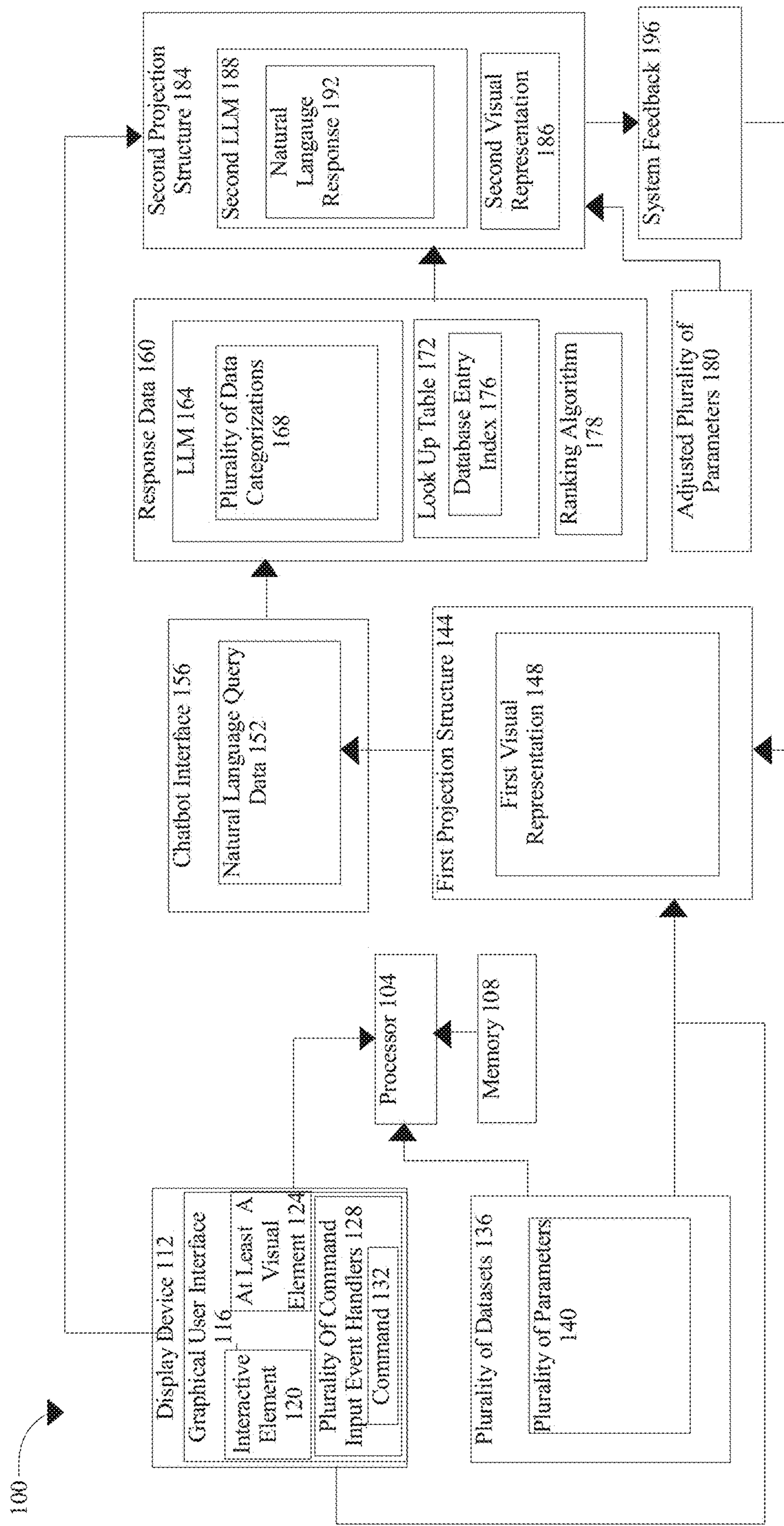
FIG. 1 is a flow diagram illustrating a system for generating a projection structure using a graphical user interface.

Referring now to FIG. 1, an exemplary embodiment of a system 100 for generating a projection structure using a graphical user interface is illustrated. System 100 may include a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 104. In one or more embodiments, data is transferred from secondary to primary memory wherein processor 104 may access the information from primary memory.

Still referring to FIG. 1, system 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the system computing device. In one or more embodiments, computing device may transmit processes to server wherein computing device may conserve power or energy.

Further referring to FIG. 1, system 100 may include any "computing device" as described in this disclosure, including without limitation a microcontroller, microprocessor, digital signal processor (DSP) and/or system on a chip (SoC) as described in this disclosure. System 100 may include, be included in, and/or communicate with a mobile device such as a mobile telephone or smartphone. System 100 may include a single computing device operating independently, or may include two or more computing devices operating in concert, in parallel, sequentially or the like; two or more computing devices may be included together in a single computing device or in two or more computing devices. System 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. System 100 may include one or more computing devices dedicated to data storage, security, distribution of traffic for load balancing, and the like. System 100 may distribute one or more computing tasks as described below across a plurality of computing devices of computing device, which may operate in parallel, in series, redundantly, or in any other manner used for distribution of tasks or memory between computing devices. System 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. In a non-limiting embodiment, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a display device 112 wherein display device 112 displays a graphical user interface 116. A "graphical user interface," as used herein, is a graphical form of user interface that allows users to interact with electronic devices. In some embodiments, GUI 116 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages, and the like may be represented using a small picture in a graphical user interface. In a non-limiting embodiment, links to decentralized platforms as described in this disclosure may be incorporated using icons. Using an icon may be a fast way to open documents, run programs etc. because clicking on them yields instant access.

As used in this disclosure, an "interactive element" is a component within a system, interface, or device that allows a user to engage with and influence the system's behavior or output through actions. In a non-limiting example, the actions may include clicking, touching, or inputting data. Without limitation, the interactive element 120 may respond dynamically to an input, enabling real-time feedback or control over system functions. In a non-limiting embodiment, without limitation the interactive element 120 may include buttons, sliders, input fields, or menus in software interfaces, as well as physical controls like switches or touchscreens in hardware devices. Each interactive element of a plurality of interactive elements may comprise an event handler configured to detect an interaction and generate response data as a function of the interaction.

As used in this disclosure, a "visual element" is a component or feature within a system, display, or interface that conveys information through visual means. In a non-limiting example, the visual element 124 may include text, images, icons, shapes, colors, and/or other graphical components designed to be perceived by the user. In a non-limiting example, the visual element 124 may aid in communication, navigation, and/or interaction with the system. Without limitation, the visual element 124 may be used to enhance user experience, guide behavior, and/or represent data visually in an intuitive or informative way. A visual element 124 may include any data transmitted to display device, client device, and/or graphical user interface 116. In some embodiments, visual element 124 may be interacted with. In a non-limiting embodiment, visual element 124 may include an interface, such as a button or menu. In some embodiments, visual element 124 may be interacted with using a user device such as a smartphone, tablet, smartwatch, or computer.

Still referring to FIG. 1, processor 104 displays, using the graphical user interface 116 a plurality of command input event handlers 128 wherein a command 132 in the plurality of command input event handlers 128 corresponds to the at least a visual element 124. As used in this disclosure, a "command input event handler" is a is a structured list of tasks, instructions, and/or operations that are organized in a specific sequence. In a non-limiting example, the plurality of command input event handlers 128 may include at least a command 132. As used in this disclosure, a "command" is an instruction or directive given to a person, system, device, and/or process to perform a specific action or task. Without limitation, the command 132 may initiate an operation, alter system behavior, or trigger a response, and may be issued manually by a user or automatically by a program or system. In a non-limiting example, the command 132 may control hardware functions, execute software routines, or interact with external systems, and may be part of a sequence within the plurality of command input event handlers 128. In a non-limiting example, the command 132 may be awaiting execution or confirmation from a user. In a non-limiting example, the plurality of command input event handlers 132 may function as a checklist where each command 132 or task may be processed, executed, or marked as completed by the user or system.

Referring to FIG. 1, at least a processor 104 may be configured to receive a plurality of datasets 136, wherein each dataset of the plurality of datasets includes a corresponding plurality of parameters. As used herein, a "plurality of datasets" refers to multiple collections of data related to an industry projection. For example, a plurality of datasets 136 may represent collections of data related to hospital unit projections. For example, each dataset may represent a specific aspect of hospital operations, such as patient demand, staffing, equipment usage, financial metrics, and the like. In an embodiment, these datasets may contain historical data, current performance metrics, or predictive data related to future operations. Additional examples may include patient admission records, projected bed occupancy rates, departmental budgets, or resource allocation statistics. As used herein, "plurality of parameters" refers to specific variables or factors within each dataset that influence an industry projection. For example, the plurality of parameters 140 may refer to specific variables or factors within each dataset that influence hospital unit projections. Non-limiting embodiments may include the number of available beds, patient-to-staff ratios, expected length of patient stays, occupancy rates, revenue per patient, and the like. Each dataset of the plurality of datasets 136 may have its own set of a plurality of parameters 140 that describe various aspects of the hospital operations, allowing system 100 to generate accurate and tailored projections for each hospital unit. GUI 116 may include at least an interactive element configured to adjust the plurality of parameters 140. These interactive elements may take the form of sliders, drop-down menus, input fields, or toggles, enabling users to modify the plurality of parameters in real time. In an embodiment, a user may adjust the projected number of incoming patients, the number of available staff members, or the financial budget allocated to a specific department. Such adjustments may directly impact the underlying datasets, causing the system to update the projections accordingly. The GUI 116 may reflect these adjustments immediately by updating the visual displays-such as bar charts, line charts, or pie charts.

In an embodiment, the plurality of datasets 136 may include geographical data relevant to each dataset and parameter, enabling the system to refine projections based on location-specific factors. Geographical data may comprise variables such as regional patient demographics, local healthcare resource availability, population density, seasonal patterns, and area-specific healthcare needs. For example, datasets may include patient admission trends specific to urban or rural areas, variations in staffing requirements based on geographic regions, or regional budget constraints tied to local economic conditions. The plurality of parameters 140 may thus include location-based variables such as the average travel distance for patients, availability of specialized care units within a region, or regional occupancy rates influenced by geographic healthcare demands. This location-based data allows system 100 to generate more contextually relevant projections that accurately reflect variations across different hospital units or service areas.

Through GUI 116, users may interactively adjust geographic parameters, such as selecting specific regions or adjusting projections for different demographic populations. Modifying these parameters in real time may allow hospital administrators to assess regional demand variations, resource allocation needs, or projected financial outcomes based on geographical differences, with immediate visualization of the adjusted projections on the interface. This capability may improve operational planning and resource management by providing location-sensitive insights tailored to each hospital unit's unique geographic context.

Still referring to FIG. 1, at least a processor 104 may be configured to generate a first projection structure 144 as a function of the plurality of datasets 136. First projection structure 144 may represent a visual or data-driven model that synthesizes the information contained within the plurality of datasets, such as hospital unit demand, resource allocation, and financial metrics. In an embodiment, a machine-learning model could be used to generate these projections within the first projection structure. This model may be trained using training data configured to correlate the plurality of datasets to projection structure data, including historical data, example data, user feedback on the accuracy of prior projection structures, and the like. User feedback may indicate an accuracy of the projection structure such that a good feedback would be used in the training data moving forward, and a bad feedback would eliminate that dataset from training data. The processor 104 may process and analyze these datasets to generate a comprehensive projection, which could include predictions about future hospital unit needs, staffing requirements, and budget forecasts. In an embodiment, first projection structure 144 include a first visual representation 148, wherein the first visual representation 148 comprises an interactive diagrammatic structure. The first visual representation 148 may be designed to present data in an understandable format, using elements such as charts, graphs, or diagrams that map the relationships between various hospital unit parameters. The interactive diagrammatic structure may allow users to engage with the data directly by clicking, dragging, or hovering over different elements of the visual display to explore detailed information or modify underlying parameters. For example, the diagrammatic structure may present a flowchart showing patient inflows, bed occupancy, and resource usage across different hospital units. By interacting with specific elements, such as a department's patient capacity, the user may adjust variables like projected admissions or available staffing. The system may then dynamically update the first visual representation 148 to reflect changes in real time, allowing users to visualize how different parameters impact overall hospital operations. This interactivity may enhance user engagement and provide a more intuitive method for managing hospital projections. In an non-limiting embodiment, the first projection structure may serve as a baseline model, allowing users to visualize and assess key performance indicators for various hospital units. The first projection structure may also incorporate metrics on resource allocation, such as the ratio of nursing staff to patients, physician availability, and operating room turnover rates, allowing administrators to identify bottlenecks or areas where resources may need to be optimized. Additionally, this baseline model may include financial KPIs, such as revenue per department, cost per patient, and profit margins, which may provide insights into each unit's financial performance. By visualizing these key metrics within the first projection structure, users can establish a performance benchmark, track compliance with hospital standards, and make data-driven decisions to improve efficiency, patient care, and operational outcomes across various hospital units. In a non-limiting embodiment, the first projection structure 144 may display expected patient admission rates, bed occupancy, or cost-efficiency metrics. By creating this structure, the system may provide valuable insights into the hospital's operations and resource needs, helping administrators make informed decisions. The generated first projection structure 144 may be displayed through the graphical user interface (GUI) 116, allowing users to further interact with the data, adjust parameters, and refine the projections as needed.

Continuing reference to FIG. 1, the display device 112 may be configured to display the first projection structure 144 through the GUI 116. This configuration may enable the system to visually present complex hospital unit projections, such as demand forecasts, resource allocations, and financial data, in a clear and interactive manner. The first projection structure 144 may be displayed in various visual formats, including charts, graphs, tables, or other graphical representations that can help users easily interpret the underlying data. By displaying the first projection structure 144 through the GUI 116, users may be able to interact with and manipulate the plurality of datasets 136 in real time. For example, the display device 112 may include zoom functionality to explore finer details of the projection, or clickable elements that provide more specific data insights, such as patient admission trends or budget breakdowns for each hospital unit. The GUI 116 may also be designed to allow seamless navigation between different projection views, enabling users to toggle between different scenarios, adjust parameters, and immediately see the impact of their changes on the displayed projection structure.

Continuing reference to FIG. 1, system 100 is configured to receive, through the GUI 116, natural language query data 152 corresponding to the first projection structure 144 using a chatbot interface 156 presented through the graphical user interface 116. As used herein, "natural language query data" refers to a natural language data input that is provided to system 100. Non-limiting examples of natural language query data 152 may include requests, commands, questions, and the like entered by a user through chatbot interface 156, which may be phrased in a way that mimics human-readable language. In another non-limiting embodiment, instead of using specific keywords or codes, a user might type or say, "Show me the projected patient admissions for next month" or "How will reducing staff by 10% affect operating costs?" The system 100 may process this natural language query data 152, extracting relevant information and instructions from the natural language text, and then performs the necessary operations, such as adjusting parameters or retrieving data, based on the natural language query data 152. As used herein, a "chatbot interface" refers to a user interface that allows users to interact with system 100 through natural language input, typically in the form of text or speech. In an embodiment, the chatbot interface 156 enables users to issue queries, provide commands, or make specific requests, to which system 100 is configured to respond with relevant data or actions. The chatbot interface 156 may utilize Natural Language Processing (NLP) to interpret and process the user's input. NLP is a subfield of artificial intelligence focused on enabling computers to process, understand, and generate human language. NLP systems consist of multiple layers of text analysis, including tokenization (breaking down a query into individual components such as words or phrases), part-of-speech tagging (identifying grammatical elements in the query), syntactic parsing (understanding sentence structure), and semantic analysis (extracting the meaning and intent behind the query). In an embodiment, the chatbot interface 156 may incorporate advanced NLP techniques, such as word embeddings (e.g., Word2Vec, GloVe), which map words to vector representations to capture context and meaning, as well as transformer-based architectures (e.g., BERT, GPT), which allow the system to handle more complex queries that depend on contextual relationships between words. Additionally, the system 100 may apply entity recognition to identify key elements within the first projection structure (e.g., patient names, medical terms, statistics) and intent recognition to classify the purpose of the first projection structure (e.g., requesting information, making a decision, performing an action). Upon processing the first projection structure, system 100 may use these NLP models to generate response data 160, which could range from retrieving structured data from databases (e.g., bed availability or admission numbers) to offering explanations based on the inferred meaning of the natural language query data 152 (e.g., reasons for patient denial). The response may be structured in a conversational manner, mimicking human-like interaction to improve the user experience. Through the chatbot interface 156, users can seamlessly interact with system 100, which leverages NLP to intelligently understand, process, and respond to queries in real time.

Still referring to FIG. 1, at least a processor 104 may be configured to generate response data 160 as a function of the natural language query data 152. As used herein, "response data" refers to information generated or retrieved by a system in direct response to the natural language query data. For example, if a user queries, "Show me the projected patient admissions for next month," the system processes the natural language query 152, categorizes the relevant information, maps it to specific database entries, and retrieves the appropriate data, such as forecasted admission numbers or resource allocations. The response data 160 is then provided to the user in a format such as text, charts, or graphs. Generating response data 160 may include processing, using a large language model 164, the natural language query data 152 to determine a plurality of data categorizations 168. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, hospital documents, insurance information, emails, user communications, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities. In an embodiment, system 100 may generate a natural language response 192 using the LLM by combining the natural language query data 152 with the structured response data 160. For example, if a user queries, "How was bed usage in the cardiology unit over the last quarter?" the processor can retrieve specific data, such as the bed usage rate of 78%, and input this alongside the query into the LLM. The LLM then produces a coherent, natural language response, such as, "Bed usage in the cardiology unit was 78% over the last quarter," directly addressing the query with factual information. This approach uses a method called retrieval-augmented generation (RAG), which reduces the likelihood of incorrect or fabricated responses by grounding the LLM's output in accurate data. By providing the response data to the LLM, rather than relying solely on the model's internal knowledge or language generation capabilities, the system May ensure that the LLM references the correct information. This method minimizes the risk of "hallucinations"-when the LLM might otherwise generate incorrect or irrelevant information—by anchoring the response in retrieved data, maintaining accuracy and reliability for the end-user.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "Os" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with queries.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing reference to FIG. 1, as used herein, "a plurality of data categorizations" refers to multiple classifications or groupings of data that are derived from the analysis of natural language query data. Each data categorization of the plurality of data categorizations 168 may identify a piece of information extracted from the natural language query 152 that can be mapped to specific data fields, categories, or parameters within the database. In a non-limiting embodiment, in response to a natural language query 152 like "Show me the projected bed occupancy for the cardiology unit next month," the system might create categorizations such as "unit type: cardiology," "data type: projected bed occupancy," and "time frame: next month." These categorizations are then used to accurately retrieve and process relevant information from the system's database. The plurality of data categorizations ensures that the query is broken down into structured components that the system can interpret and act upon effectively. In an embodiment, generating response data 160 may include mapping, as a function of a look up table 172 each plurality of data categorizations 168 to a database entry index 176. The look-up table 172 may store predefined mappings where each key represents a data categorization derived from the natural language query 152, and each value may represent a unique database entry index 176, corresponding to specific records or datasets within the system's database. A "look-up table" is a data structure, often stored in memory, that is used to map input values to corresponding output values, enabling quick retrieval of information without recalculating it. In an embodiment, look-up tables are precomputed, meaning the relationships between inputs and outputs may be established in advance and stored for efficient access during runtime. In computing, look-up tables are widely used for applications like mathematical functions, color matching, and data encoding, where they help replace repetitive computations with a simple memory access. Using a look-up table can significantly save processing power and time during runtime. By enabling the system to retrieve precomputed results directly from memory rather than performing the same calculations repeatedly, look-up tables can optimize performance, especially for tasks involving frequent, repetitive operations. This approach is particularly valuable in applications with high processing demands, as it allows the system to execute faster and more efficiently by minimizing computational overhead. When system 100 may process the natural language query 152 using a LLM 164, it may tokenize and parse the input to extract data categorizations, which may then used as search keys. The processor may execute a mapping function that queries the look-up table, passing each categorization as a key and retrieving the associated database entry index. This index may function as an address or reference pointer, enabling the system to perform an efficient database query using an SQL-like command or API call to fetch the relevant data. The mapping operation may be optimized through techniques such as caching frequently used key-index pairs in memory, or by using a balanced binary search tree for the look-up table. Furthermore, the look-up table 172 may be dynamically updated at runtime based on new data categorizations introduced by evolving user queries or changes in the database schema. In an embodiment, each data categorization of the plurality of data categorizations 168 comprises an accuracy score, wherein only categories with an accuracy score above a threshold are mapped to the database entry index 176. The accuracy score may be computed by the system's large language model (LLM) based on at least the relevance of the categorization to the natural language query terms, and the historical accuracy of similar natural language queries. The score may be represented as a numerical value, such as a probability between 0 and 1, or a percentage, indicating the likelihood that the categorization is accurate. During the response data generation process, only those data categorizations with an accuracy score above a predefined threshold may be mapped to a corresponding database entry index. This threshold may be set dynamically or configured as a system parameter, allowing the system to filter out low-confidence categorizations that could lead to incorrect or irrelevant data retrieval. For example, if a categorization's accuracy score is below the threshold (e.g., 0.75 or 75%), it may be excluded from the mapping process, thereby preventing erroneous data from being pulled from the database. The accuracy score mechanism may enhance the system's precision by ensuring that only high-confidence categorizations contribute to the final response. In an embodiment, the accuracy scoring system may be further refined over time using feedback from user interactions or historical performance data. In an embodiment, obtaining the response data 160 from the database may include performing a ranking algorithm 178 to prioritize each database entry index 176 as a function of the natural language query data 152. Once system 100 has mapped the plurality of data categorizations 168 to corresponding database entry indexes 176, it may retrieve multiple potential data entries from the database. Since not all retrieved entries may be equally relevant to the natural language query 152, a ranking algorithm 178 may be applied to order the results based on their relevance. The ranking algorithm may use a variety of factors to assign a relevance score to each database entry. These factors may include the semantic similarity between the query terms and the database content, the historical accuracy or relevance of the entries in previous queries, the frequency of data access, and the overall confidence level associated with the data categorizations. The relevance score may then be used to sort and rank the database entries, with higher-scoring entries prioritized for display or further processing. In a non-limiting embodiment, for hospital unit projections, a natural language query for "next month's cardiology unit patient admissions" may retrieve data related to multiple time frames or departments. The ranking algorithm 178 may prioritize data specifically related to the cardiology unit and the requested time period, pushing less relevant entries (e.g., data from other units or different time frames) lower in the ranking. Additionally, the ranking algorithm may be adaptive, learning from user interactions over time. For example, if users frequently select certain data points in response to similar queries, the system may adjust its ranking criteria to prioritize those entries in the future.

With continued reference to FIG. 1, at least a processor 104 may be configured to generate adjusted plurality of parameters 180 as a function of the response data 160. In this embodiment, once the system has retrieved and processed the response data in response to the natural language query, the processor 104 may analyze the response and may dynamically adjust one or more parameters associated with the underlying datasets. The adjusted parameters 180 may represent variables related to hospital unit projections, such as staffing levels, patient admissions, resource allocation, or budgetary constraints. The adjusted parameters 180 may be driven by insights obtained from the response data 160, allowing the system to fine-tune the projection structure. For example, if the response data indicates a higher-than-expected patient admission rate, the system may adjust parameters like the number of available staff or hospital bed allocation to reflect the increased demand. Similarly, if financial projections suggest budgetary concerns, the processor 104 may adjust spending parameters to optimize the distribution of resources across hospital units.

These adjusted parameters 180 may then be used to generate a second projection structure 184, which may be displayed through the graphical user interface (GUI) 116, enabling users to visualize the impact of these adjustments in real time. In an embodiment, adjusted parameters 180 may then be reflected through the interactive elements of the first projection structure, such as sliders, drop-down menus, or graphical displays. This dynamic feedback may allow users to interact with and explore the updated data more effectively, visualizing how the adjustments impact key variables.

With continued reference to FIG. 1, at least a processor 104 may be configured to generate a second projection structure 184 as a function of the response data 160 and the adjusted plurality of parameters 180. As used herein, a "second projection structure" refers to an updated model or visual representation that is generated as a function of the response data and the adjusted plurality of parameters. The second projection structure 184 may be created after system 100 receives a natural language query data 152, processes it to retrieve response data 160, and then adjusts key parameters within the dataset based on this response data. In an embodiment, the second projection structure may reflect the impact of both the user's input (the natural language query) and the system's real-time adjustments. It may serve as an updated, more refined version of the first projection structure 144, incorporating changes driven by new information from the response data. The second projection structure 184 may be displayed visually through the system's graphical user interface (GUI), enabling users to observe how the changes in parameters influence the overall hospital unit projections, such as updated demand forecasts, resource needs, or financial estimates.

In an embodiment, generating the second projection structure 184 may include generating a natural language response 192 as a function of the natural language query data and the response data using a second large language model 188. The second projection structure 184 may be created after the system receives a natural language query data 152, processes it to retrieve response data 160, and then adjusts key parameters within the dataset based on this response data 160. These adjusted parameters may include changes in resource allocation, staffing levels, financial forecasts, or patient demand, depending on the specifics of the query and the hospital unit projections. As a result, the second projection structure 184 may reflect the impact of both the user's input (the natural language query 152) and the system's real-time adjustments. It may serve as an updated, more refined version of the first projection structure 144, incorporating changes driven by new information from the response data 160. The second projection structure 160 may be displayed visually through the system's graphical user interface (GUI) 116, enabling users to observe how the changes in parameters influence the overall hospital unit projections, such as updated demand forecasts, resource needs, or financial estimates. In an embodiment, the second large language model 188 may be trained using historical query data correlated example response data.

In an embodiment, the at least a processor 104 may be configured to generate a second visual representation 186 of the second projection structure 184 wherein the second visual representation 186 may include a second interactive diagrammatic structure. The second visual representation 186 may be designed to visually convey the adjusted parameters and refined projections resulting from the response data, providing users with an updated and intuitive view of the hospital unit projections. The second visual representation 186 may present data in various formats, such as updated bar charts, line graphs, or network diagrams, each dynamically reflecting the plurality of adjusted parameters 180. This interactive structure may allow users to engage with the data in real-time by selecting, expanding, or drilling down into specific elements to view detailed information on particular metrics, such as staffing levels, bed occupancy rates, or budget allocations. In an embodiment, a machine-learning model could be used to generate second projection structure. This model may be trained using training data configured to correlate the response data to second projection structure data, including historical data, example data, user feedback on the accuracy of prior projection structures, and the like. User feedback may indicate an accuracy of the projection structure such that good feedback would be used in the training data moving forward, and a bad feedback would eliminate that dataset from training data. Users may also interact with adjustable sliders, input fields, or toggle switches within the diagrammatic structure to further modify parameters, exploring "what-if" scenarios to understand potential outcomes and impacts on projections. Additionally, the second visual representation 186 may be configured to highlight changes from the first projection structure 144, such as color-coded or animated elements to indicate increases, decreases, or trends in key variables. This feature may improve user comprehension by clearly illustrating how the adjustments in the second projection structure have altered the forecasted hospital metrics. Overall, the second interactive diagrammatic structure may provide a highly accessible and responsive tool for hospital administrators to evaluate real-time projections, assess resource needs, and make data-driven decisions with precision and flexibility. In an embodiment, the at least a processor 104 may be configured to track modifications to the second projection structure 184, wherein the tracked modifications are used to retrain the large language model 164. Each modification to the second projection structure may provide valuable feedback to the system, highlighting patterns in user preferences, common adjustments, or frequently queried data categorizations. For example, if users consistently modify staffing levels in response to particular demand forecasts, or if certain budgetary adjustments are repeatedly applied across similar scenarios, the processor 104 may log these actions as part of a learning dataset. This dataset of tracked modifications may then be fed back into LLM 164, allowing it to learn from user interactions and incorporate these insights into future query processing. By retraining LLM 164 on these tracked modifications, the system may improve its ability to understand and anticipate user intentions, enhance categorization accuracy, and refine response data generation in subsequent queries.

With continued reference to FIG. 1, the display device 112 may be configured to display the second projection structure 184 in the graphical user interface 116. GUI 116 may be designed to present the second projection structure 184 in a clear format, which may include various visualization tools, such as interactive charts, graphs, or layered diagrammatic elements. When displayed, the second projection structure 184 may include visual indicators to highlight changes from the first projection structure 144, allowing users to easily identify how specific parameters have been modified. These indicators may include color-coding, animations, or graphical icons that draw attention to key updates, such as increases in patient admission forecasts, reallocated resources, or adjusted budget figures. GUI 116 may provide interactive controls, enabling users to engage directly with the second projection structure 184 by clicking on elements, zooming in for detailed views, or filtering data to focus on particular units, timeframes, or metrics. In an embodiment, displaying the second projection structure 184 may include receiving, using the at least a processor 104, system feedback 196. System feedback 196 may encompass real-time information on how users engage with the second projection structure 184, such as specific elements they interact with, adjustments they make, or areas of the interface that receive more focus or modifications. In an embodiment, system feedback 196 may be used to update first projection structure 144. This feedback may also include performance metrics, such as the speed and responsiveness of updates in the projection structure when parameters are adjusted or when response data is retrieved. In a non-limiting embodiment, if a user's adjustments to resource allocation or patient demand projections create delays in the visual updates, this feedback can provide insights for optimizing the processing efficiency or improving data retrieval algorithms. Furthermore, system feedback 196 may capture data on any discrepancies between user expectations and system-generated projections, potentially indicating areas where the model could be retrained or refined to improve accuracy. In addition, system feedback 196 may be used to improve the personalization of future projection structures. For example, if repeated feedback indicates that users frequently modify certain parameters, the system may preemptively adjust these aspects in similar projections or offer recommended parameter ranges based on past interactions. In an embodiment, displaying the second projection structure 184 may include generating dynamic updates to the graphical user interface as a function of the system feedback 196. System feedback 196 may provide continuous input on factors such as which projection elements are frequently adjusted, the types of data users explore, and any delays or inefficiencies in visual updates, enabling the processor 104 to make real-time adjustments to the display. Dynamic updates to the GUI 116 may include modifications to the layout, highlighting of frequently accessed data, or adjustments to parameter controls, enhancing usability based on observed interaction patterns. In a non-limiting embodiment, if feedback shows that users frequently explore projections for specific hospital units, the system may dynamically rearrange the GUI to prioritize these units or make them more accessible in the visual display. Similarly, if system feedback indicates that certain parameter adjustments, such as patient admission rates or budget allocations, are commonly modified, the GUI may provide quicker access to these controls or display default values in alignment with historical preferences. Additionally, dynamic updates may extend to visual cues and animations that highlight recent changes in the second projection structure 184, helping users immediately see the impact of updated parameters or new data. For example, adjustments to the projection structure based on increased patient demand may trigger a color-coded alert or animate a graph segment to draw attention to resource constraints.

Figure 2A:
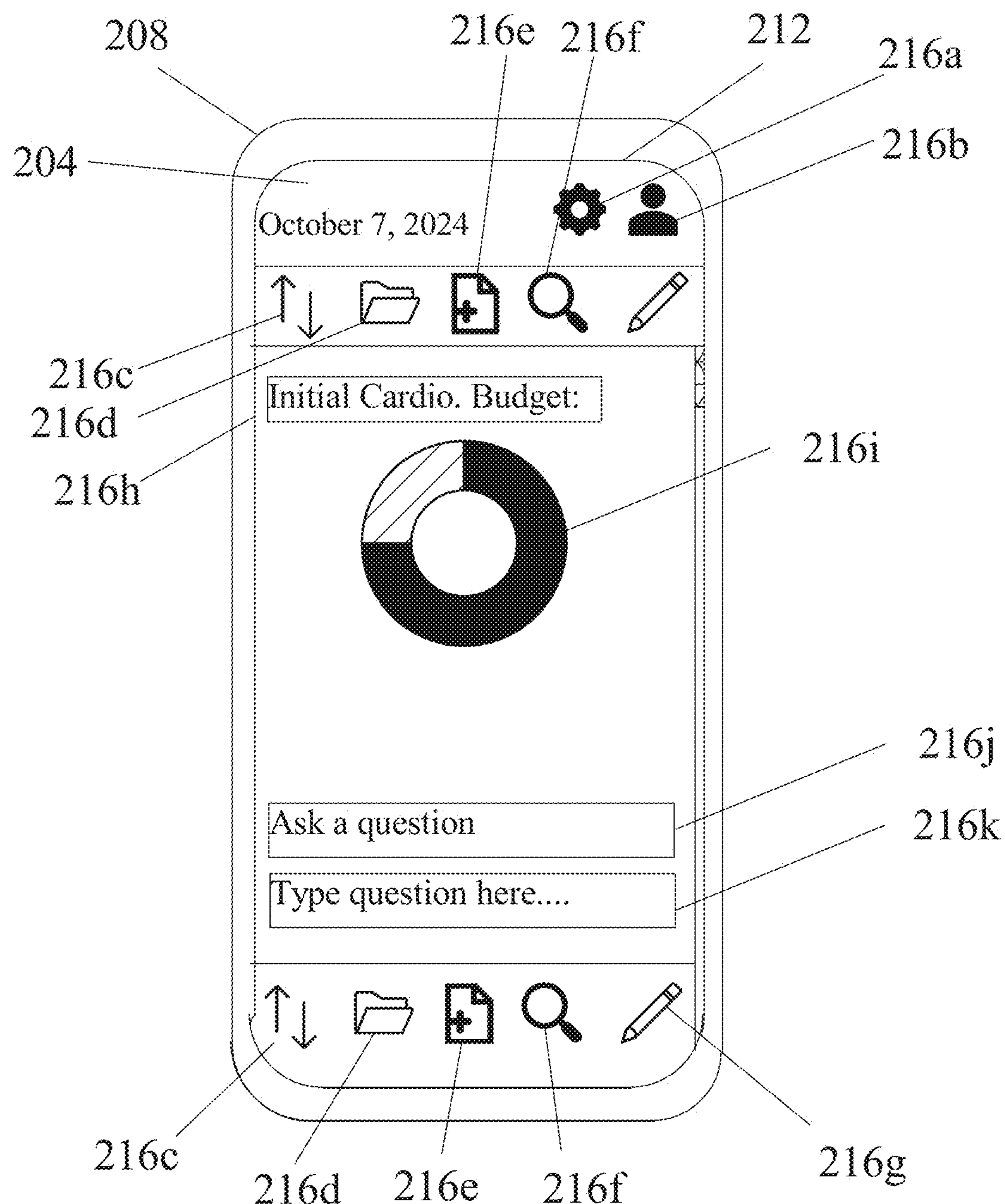
FIG. 2A is an exemplary illustration of a first projection structure in a graphical user interface.

Referring now to FIG. 2A, an exemplary illustration 200*a* of a graphical user interface. In an embodiment, the graphical user interface 204 may be displayed using a downstream device 208. In an embodiment, the graphical user interface 204 may include at least a visual element 212. In an embodiment, the visual element 212 may include an interactive element 216. In an embodiment the interactive element 216 may allow a user to engage directly with the graphical user interface 204 through a variety of actions.

In an embodiment, the interactive element 216*a-i* may include a settings gear 216*a*, a profile icon 216*b*, a sorting icon 216*c*, a folder 216*d*, a new task icon 216*e*, a find icon 216*f*, an edit icon 216*g*, a check box icon 216*h*, a scroll bar 216*i*, text description 216*j*, and the like.

In an embodiment, the interactive element 216 may include a settings gear 216*a*. In an embodiment, the settings gear 216*a* may enable users to access the system or application settings where they may modify preferences and configurations. Without limitation, by clicking on the settings gear 216*a*, users may adjust features like notifications, display options, account details, and the like. In an embodiment, the settings gear 216*a* may represent control over personalizing the environment within the application. In an embodiment, the settings gear 216*a* may ensure that users can customize their experience to meet their specific needs.

In an embodiment, the interactive element 216 may include a profile icon 216*b*, which may allow users to access their personal profile settings. In an embodiment, the profile icon 216*b* may link to a page where users may view and edit their personal information, such as their name, contact details, or profile picture. In an embodiment, the profile icon 216*b* may make it simple for users to manage their account and view related data quickly. In an embodiment, the profile icon 216*b* may be placed in a convenient location, allowing easy access to account settings. In an embodiment, the profile icon 216*b* may help users maintain control over their profile, ensuring that their information stays up-to-date.

In an embodiment, the interactive element 216 may include a sorting icon 216*c*, which may allow users to organize data based on specific criteria. In an embodiment, the sorting icon 216*c* may be useful when dealing with large datasets or lists that need to be filtered or reordered. Without limitation, by clicking the sorting icon 216*c*, users may arrange items by various attributes such as date, name, priority, and the like. In an embodiment, the sorting icon 216*c* may simplify the process of locating specific information, making the interface more efficient to use. In an embodiment, the sorting icon 216*c* may ensure that users can easily customize how they view and interact with the content.

In an embodiment, the interactive element 216 may include a folder icon 216*d*, which may represent access to a file or document management system. Without limitation, by clicking on the folder icon 216*d* it may open a directory or list of stored files, allowing users to organize their content within the application. In an embodiment, the folder icon 216*d* may be essential for managing documents, media, or other file types efficiently. In an embodiment, the folder icon 216*d* may be associated with file storage and navigation, making it a familiar and intuitive tool for users. In an embodiment, the folder icon 216*d* may aid in keeping information organized and accessible within the system.

In an embodiment, the interactive element 216 may include a new task icon 216*e*, which may allow users to create or add a new item to their task list or project. In an embodiment, the new task icon 216*e* may provide a quick way for users to input new assignments or goals, streamlining task management. In an embodiment, the new task icon 216*e* once clicked, may open a form or prompt where users may specify details about the new task. In an embodiment, the new task icon 216*e* may help users stay organized by adding tasks efficiently as they arise. In an embodiment, the new task icon 216*e* may be a valuable tool for productivity, helping users keep track of their to-do lists.

In an embodiment, the interactive element 216 may include a find icon 216*f*, which may function as a search tool for locating specific information within the application. In an embodiment, the find icon 216*f* may allow users to quickly search through data, files, or content to pinpoint exactly what they need. In an embodiment, the find icon 216*f* may be especially useful in applications that manage large volumes of information or files. In an embodiment, the find icon 216*f* may enhance efficiency by reducing the time spent manually browsing through content. Continuing, by providing a fast search function, users may access information more quickly and effectively.

In an embodiment, the interactive element 216 may include an edit icon 216*g*, which may enable users to modify or update existing content within the application. Continuing, by clicking on the edit icon 216*g*, it may bring users to an editable version of the item, such as a text document, task, or file. In an embodiment, the edit icon 216*g* may allow users to make corrections or updates as needed, maintaining the accuracy of the information. In an embodiment, the edit icon 216*g* may ensure that content remains current and can be easily adjusted as situations or data change. In an embodiment, the edit icon 216*g* may be a crucial tool for users who frequently update or revise their work.

Continuing reference to FIG. 2, interactive element 216*h* may include information pertaining to a plurality of datasets represented by a text box with identifying information related to the plurality of datasets. When the user clicks or taps on the prompt box, the placeholder text may disappear, and display more information identifying the plurality of datasets indicated in the first projection structure.

Continuing reference to FIG. 2, interactive element 216*i* includes a visual representation of the first projection structure. In an embodiment, interactive element 216*j* may include a graphical or diagrammatic representation of the plurality of inputs. In an embodiment, a shaded portion of a diagrammatic representation may represent inputs within the plurality of inputs that are not optimized, whereas a non-shaded portion may represent the inputs within the plurality of inputs that are optimized. The representation could be generated in real-time based on the plurality of inputs and may display various types of data, such as text summaries, charts, tables, or other visual representations of the system's response. The response structure may be interactive, allowing users to engage with the displayed information. For instance, users could click on specific elements within the diagrammatic representation, such as data points on a chart or text segments, to request additional details, perform follow-up actions, adjust optimized versus nonoptimized inputs, and the like. This interactive nature enables the response structure to serve not only as a display for the system's output but also as a hub for further user interaction, driving the flow of information based on evolving plurality of inputs. In some embodiments, the diagrammatic representation may be designed to dynamically update in response to changes in the plurality of inputs or the system's internal state. For example, if the user submits modifies parameters of the plurality of inputs, the diagrammatic representation could be automatically refreshed to reflect the new data. The graphical elements within the structure, such as charts or tables, may be reconfigured to highlight relevant information or present new insights derived from the updated input.

Figure 2B:
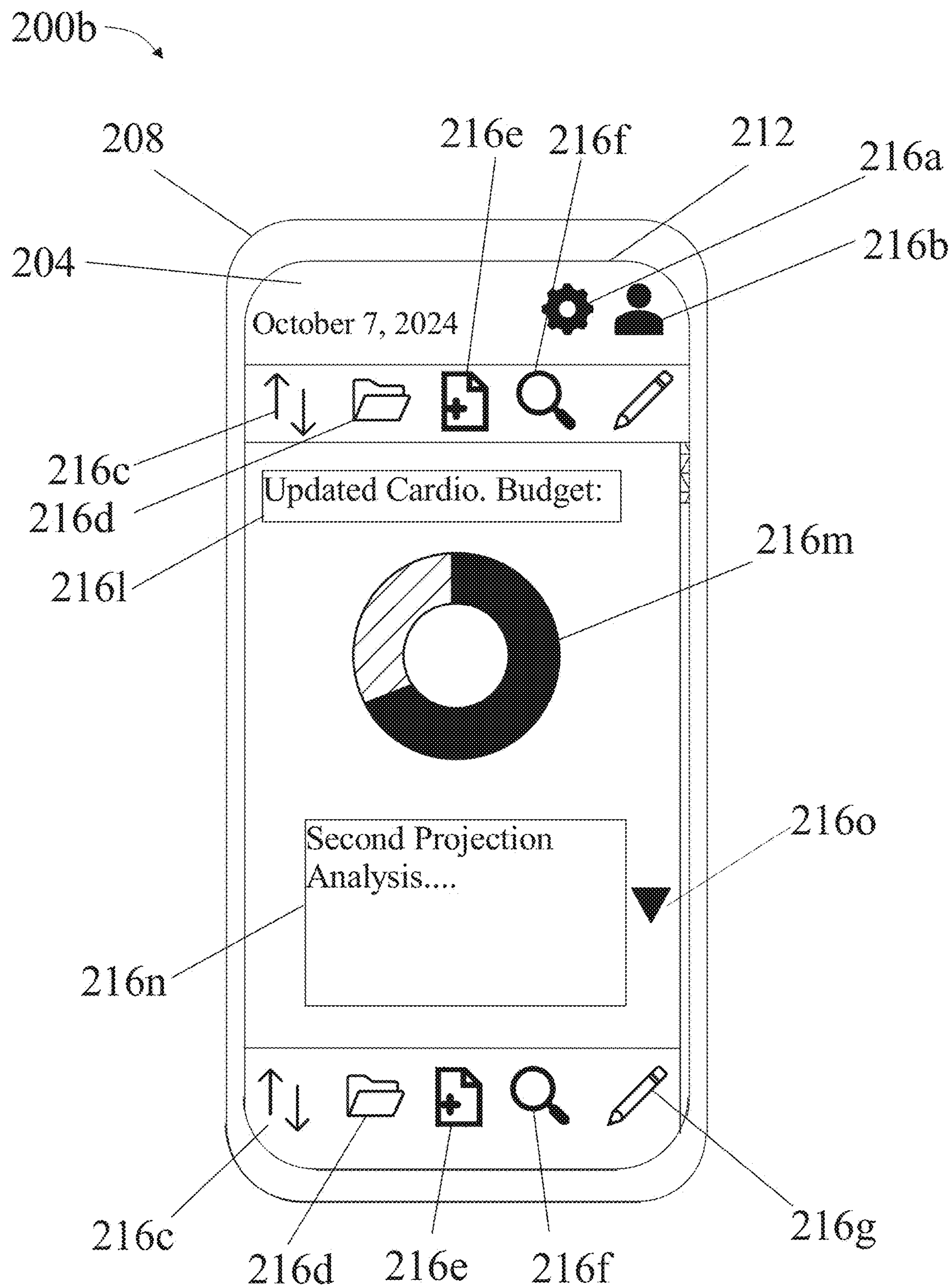
FIG. 2B is an exemplary illustration of a second projection structure in a graphical user interface.

Now referring to FIG. 2B, an exemplary illustration 200*b* of a second projection structure in a graphical user interface. Interactive element 216*l* may include information pertaining to a response data related to the plurality of datasets represented by a text box with identifying information related to the response data. When the user clicks or taps on the prompt box, the placeholder text may disappear, and display more information identifying the response data related to the plurality of datasets indicated in the second projection structure.

In an embodiment, interactive element 216*m* may include a graphical or diagrammatic representation of the plurality of inputs. In an embodiment, a shaded portion of a diagrammatic representation may represent inputs within the plurality of inputs that are not optimized, whereas a non-shaded portion may represent the inputs within the plurality of inputs that are optimized. The representation could be generated in real-time based on the plurality of inputs and may display various types of data, such as text summaries, charts, tables, or other visual representations of the system's response. The second response structure may be interactive, allowing users to engage with the displayed information. For instance, users could click on specific elements within the diagrammatic representation, such as data points on a chart or text segments, to request additional details, perform follow-up actions, adjust optimized versus nonoptimized inputs, and the like. This interactive nature enables the response structure to serve not only as a display for the system's output but also as a hub for further user interaction, driving the flow of information based on evolving plurality of inputs. In some embodiments, the diagrammatic representation may be designed to dynamically update in response to changes in the plurality of inputs or the system's internal state. For example, if the user submits modifies parameters of the plurality of inputs, the diagrammatic representation could be automatically refreshed to reflect the new data. The graphical elements within the structure, such as charts or tables, may be reconfigured to highlight relevant information or present new insights derived from the updated input.

Continuing reference to FIG. 2B, the interactive element 216*n* includes a response structure, serving as the output area where system 100 presents the results of the admission pathway. The response structure displays key decisions, such as admission recommendations, department assignment, and resource needs. Additionally, a dropdown icon 216*m* allows the user to expand the admission pathway analysis, revealing detailed explanations behind the system's recommendations and ranked inputs. This interactive feature provides users with the ability to explore, adjust, and offer feedback, dynamically updating the results based on new inputs or user modifications. The interactive element 216*n* provides a detailed analysis of the optimized input, showing how it influences the admission pathway. It highlights why this input was ranked highest and its impact on the overall decision. A dropdown icon 2160 allows users to expand the analysis, providing more in-depth reasoning and supporting data behind the ranking. This interactive feature gives users the ability to explore the optimized input's role and adjust parameters, offering feedback or modifying the decision-making process as needed.

Figure 3:
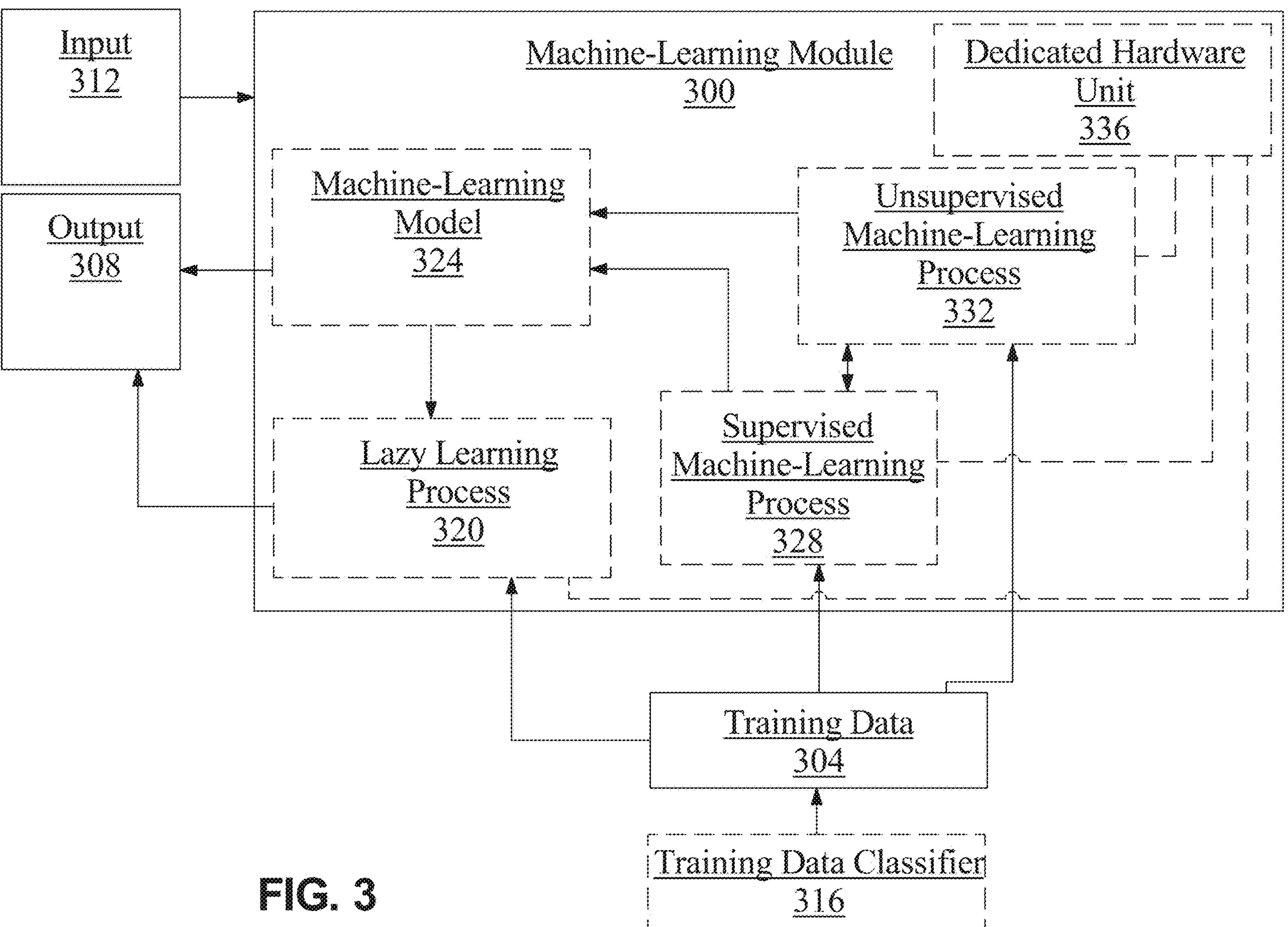
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. In a non-limiting embodiment, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; In a non-limiting embodiment, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, In a non-limiting embodiment by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; In a non-limiting embodiment, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, In a non-limiting embodiment, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs such as user input and plurality of command input event handlers and outputs such as optimization datum.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of historical reference data and categories of historical plurality of command input event handlers.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. In a non-limiting embodiment, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, In a non-limiting embodiment, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. In a non-limiting embodiment, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, In a non-limiting embodiment, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. In a non-limiting embodiment, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, In a non-limiting embodiment, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. In a non-limiting embodiment, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. In a non-limiting embodiment, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. In a non-limiting embodiment, a computing device, processor, and/or module may convert a smaller number of units, such as in a low pixel count image, into a desired number of units, In a non-limiting embodiment by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, In a non-limiting embodiment by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, In a non-limiting embodiment as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, In a non-limiting embodiment using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. In a non-limiting embodiment, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. In a non-limiting embodiment, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. In a non-limiting embodiment, a supervised learning algorithm may include user input and plurality of command input event handlers as described above as inputs, optimization datum as outputs, and a scoring function representing a desired form of relationship to be detected between inputs and outputs; scoring function may, In a non-limiting embodiment, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. In a non-limiting embodiment, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, In a non-limiting embodiment, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. In a non-limiting embodiment, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, system, system and/or module. In a non-limiting embodiment, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, system, and/or method described in this disclosure; such examples may be modified and/or labeled according to user feedback or other processes to indicate desired results, and/or may have actual or measured results from a process being modeled and/or predicted by system, module, machine-learning model or algorithm, system, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, In a non-limiting embodiment, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, system, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
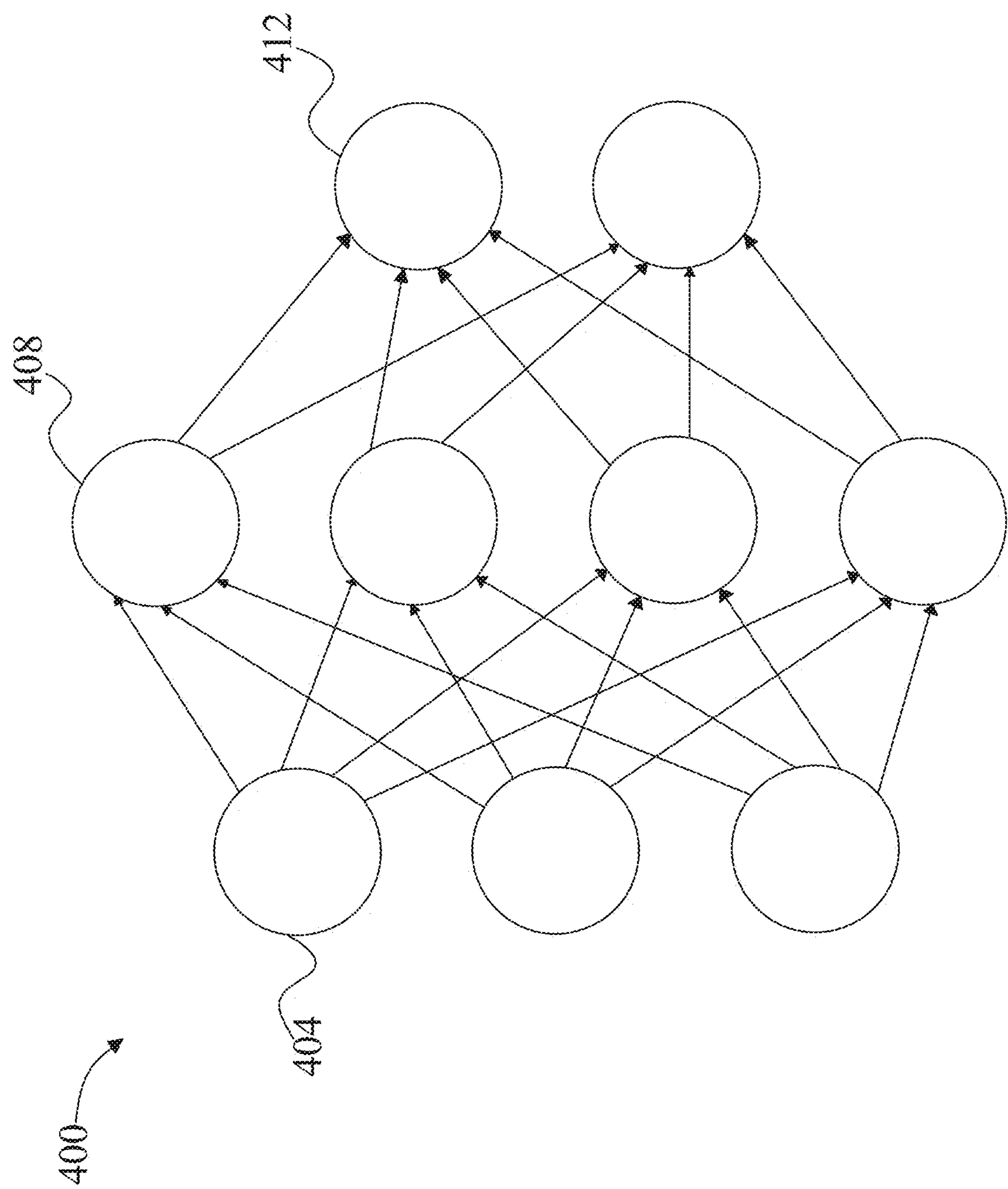
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
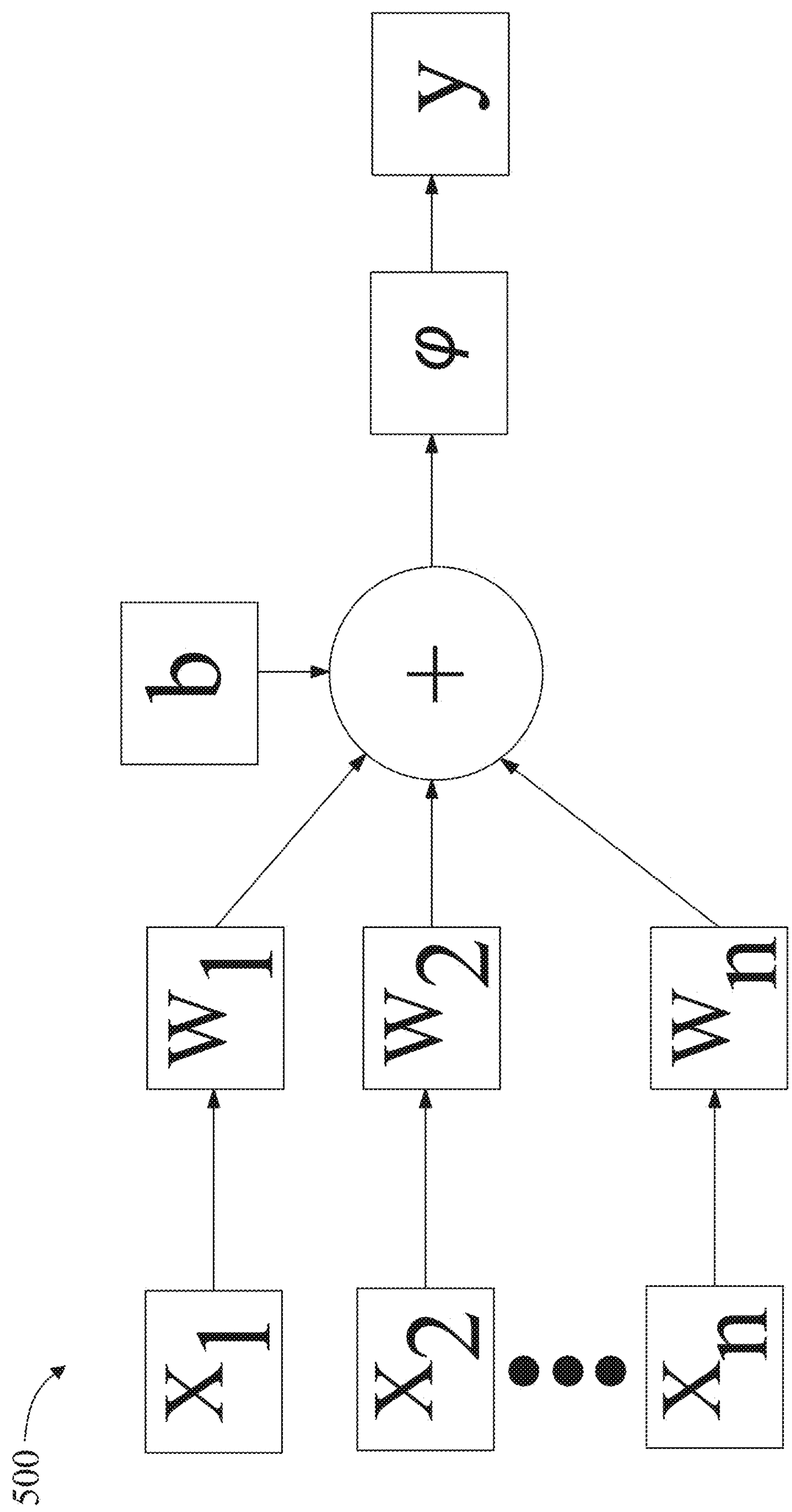
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x)=\begin{cases} x \text{ for } x \geq 0 \\ \alpha(e^x-1) \text{ for } x<0 \end{cases}$$

for some value of α (this function may be replaced and/or weighted by its own derivative in some embodiments), a softmax function such as $$f(x_i)=\frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x)=\lambda\begin{cases} \alpha(e^x-1) \text{ for } x<0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, In a non-limiting embodiment by the corresponding weight having a large numerical value, and/or a "inhibitory," indicating it has a weak effect influence on the one more inputs y, In a non-limiting embodiment by the corresponding weight having a small numerical value. The values of weights $w_i$ may be determined by training a neural network using training data, which may be performed using any suitable process as described above.

Figure 6:
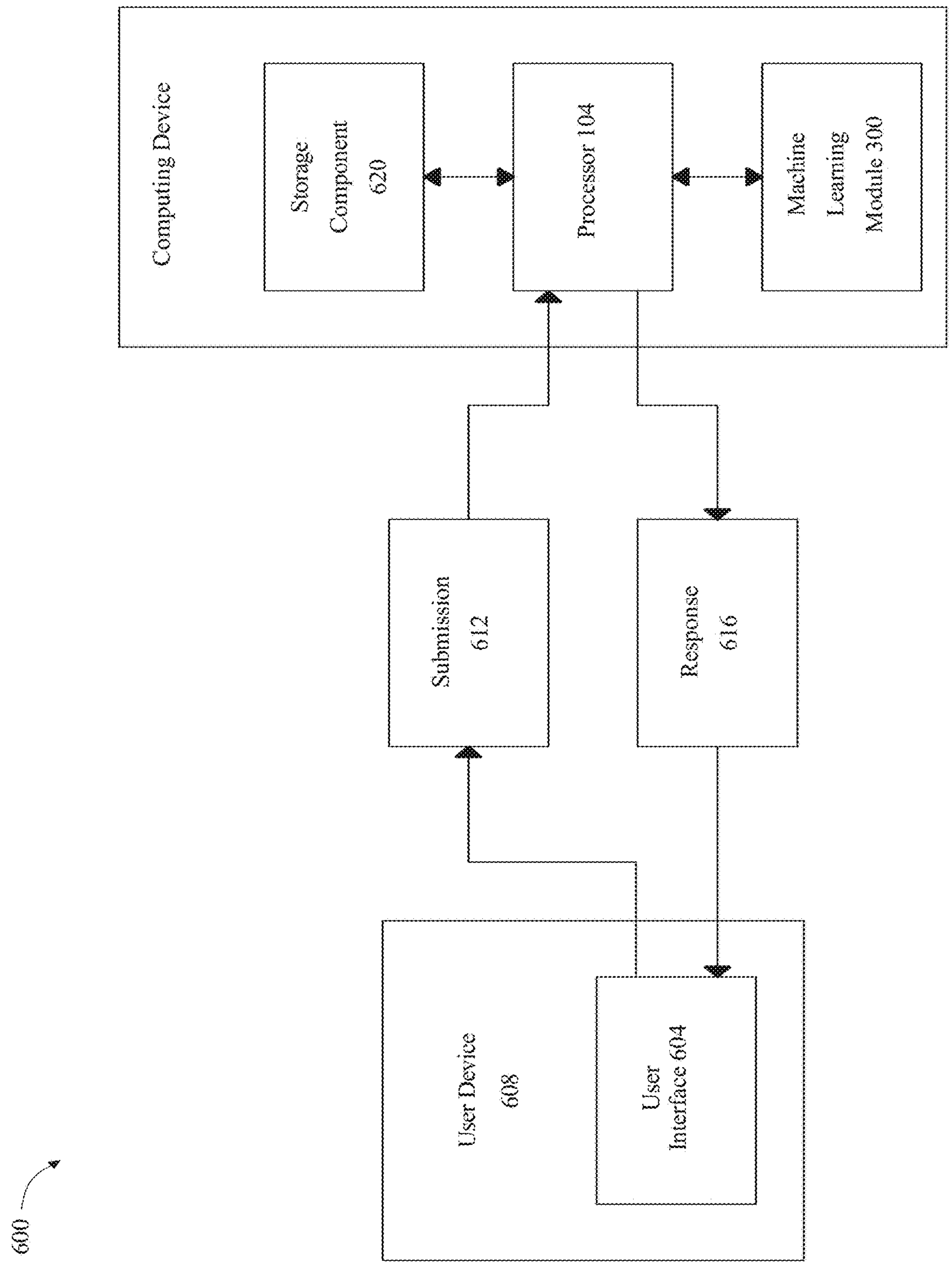
FIG. 6 is an exemplary embodiment of a chatbot system.

Referring now to FIG. 6, in one or more embodiments, system 100 may perform one or more of its functions, such as outputting at least an natural language response 192, by implementing at least a chatbot system 600, an exemplary embodiment of which is schematically illustrated. In one or more embodiments, a user interface 604 may be communicatively connected with a computing device that is configured to operate a chatbot. In some cases, user interface 604 may be local to computing device. Alternatively, or additionally, in some other cases, user interface 604 may be remote to computing device, e.g., as part of a user device 608, and communicative with the computing device and processor 104 therein, by way of one or more networks, such as without limitation the internet. Alternatively, or additionally, user interface 604 may communicate with user interface 604 and/or computing device using telephonic devices and networks, such as without limitation fax machines, short message service (SMS), or multimedia message service (MMS). Commonly, user interface 604 may communicate with computing device using text-based communication, for example without limitation using a character encoding protocol, such as American Standard for Information Interchange (ASCII). Typically, user interface 604 may conversationally interface a chatbot, by way of at least a submission 612, from the user interface 604 to the chatbot, and a response 616, from the chatbot to the user interface 604. In many cases, one, or both, of submission 612 and response 616 are text-based communication. Alternatively, or additionally, in some cases, one or both of submission 612 and response 616 are audio-based communication.

With continued reference to FIG. 6, submission 612, once received by user interface 604 and/or computing device that operates a chatbot, may be processed by processor 102. In one or more embodiments, processor 104 may process submission 612 using one or more of keyword recognition, pattern matching, and natural language processing. In one or more embodiments, processor 104 may employ real-time learning with evolutionary algorithms. In one or more embodiments, processor 104 may retrieve a pre-prepared response from at least a storage component 620, based upon submission 612. Alternatively, or additionally, in one or more embodiments, processor 102 may communicate a response 616 without first receiving a submission 612, thereby initiating a conversation. In some cases, processor 104 may communicate an inquiry to user interface 604 and/or computing device, wherein processor 104 is configured to process an answer to the inquiry in a following submission 612 from the user interface 604 and/or computing device. In some cases, an answer to an inquiry presented within submission 612 from user interface 604 and/or computing device may be used by the computing device as an input to another function.

Figure 7:
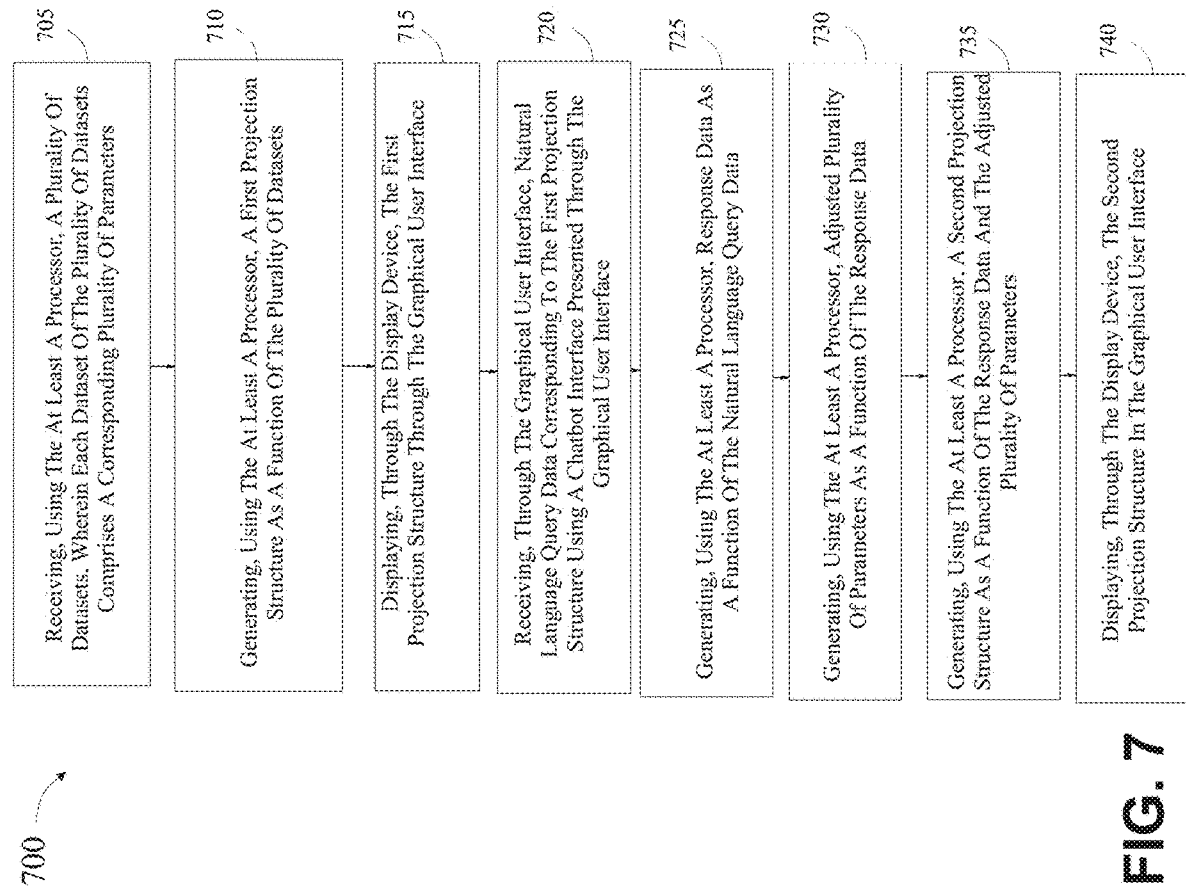
FIG. 7 is a block diagram of an exemplary embodiment for generating a projection structure using a graphical user interface.

Now referring to FIG. 7, a flow diagram of an exemplary method 700 for generating a projection structure using a graphical user interface is illustrated. At step 705, method 700 includes receiving, using the at least a processor, a plurality of datasets, wherein each dataset of the plurality of datasets comprises a corresponding plurality of parameters. This may be implemented with reference to FIGS. 1-6.

Still referring to FIG. 7, at step 710, method 700 includes generating, using the at least a processor, a first projection structure as a function of the plurality of datasets. In an embodiment, at least a processor is configured to generate a visual representation of the first projection structure and the second projection structure, wherein the visual representation comprises an interactive diagrammatic structure, and the graphical user interface comprises at least an interactive element configured to adjust the plurality of parameters and the adjusted plurality of parameters. This may be implemented with reference to FIGS. 1-6.

Still referring to FIG. 7, at step 715, method 700 includes displaying, through the display device, the first projection structure through the graphical user interface. This may be implemented with reference to FIGS. 1-6.

Still referring to FIG. 7, at step 720, method 700 includes receiving, through the graphical user interface, natural language query data corresponding to the first projection structure using a chatbot interface presented through the graphical user interface. This may be implemented with reference to FIGS. 1-6.

Still referring to FIG. 7, at step 725, method 700 includes generating, using the at least a processor, response data as a function of the natural language query data, wherein generating the response data comprises: processing, using a large language model, the natural language query data to determine a plurality of data categorizations; mapping, as a function of a look up table, each the plurality of data categorizations to a database entry index; and obtaining the response data from a database as a function of each database entry index. This may be implemented with reference to FIGS. 1-6.

Still referring to FIG. 7, at step 730, method 700 includes generating, using the at least a processor, adjusted plurality of parameters as a function of the response data. This may be implemented with reference to FIGS. 1-6.

Still referring to FIG. 7, at step 735, method 700 includes generating, using the at least a processor, a second projection structure as a function of the response data and the adjusted plurality of parameters. In an embodiment, the second large language model is trained using historical query data and example response data. This may be implemented with reference to FIGS. 1-6.

Still referring to FIG. 7, at step 740, method 700 includes displaying, through the display device, the second projection structure in the graphical user interface. In an embodiment, displaying the second projection structure comprises displaying at least a second interactive element configured to: receive, using the at least a processor, system feedback; and generate dynamic updates to the graphical user interface as a function of the system feedback. This may be implemented with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
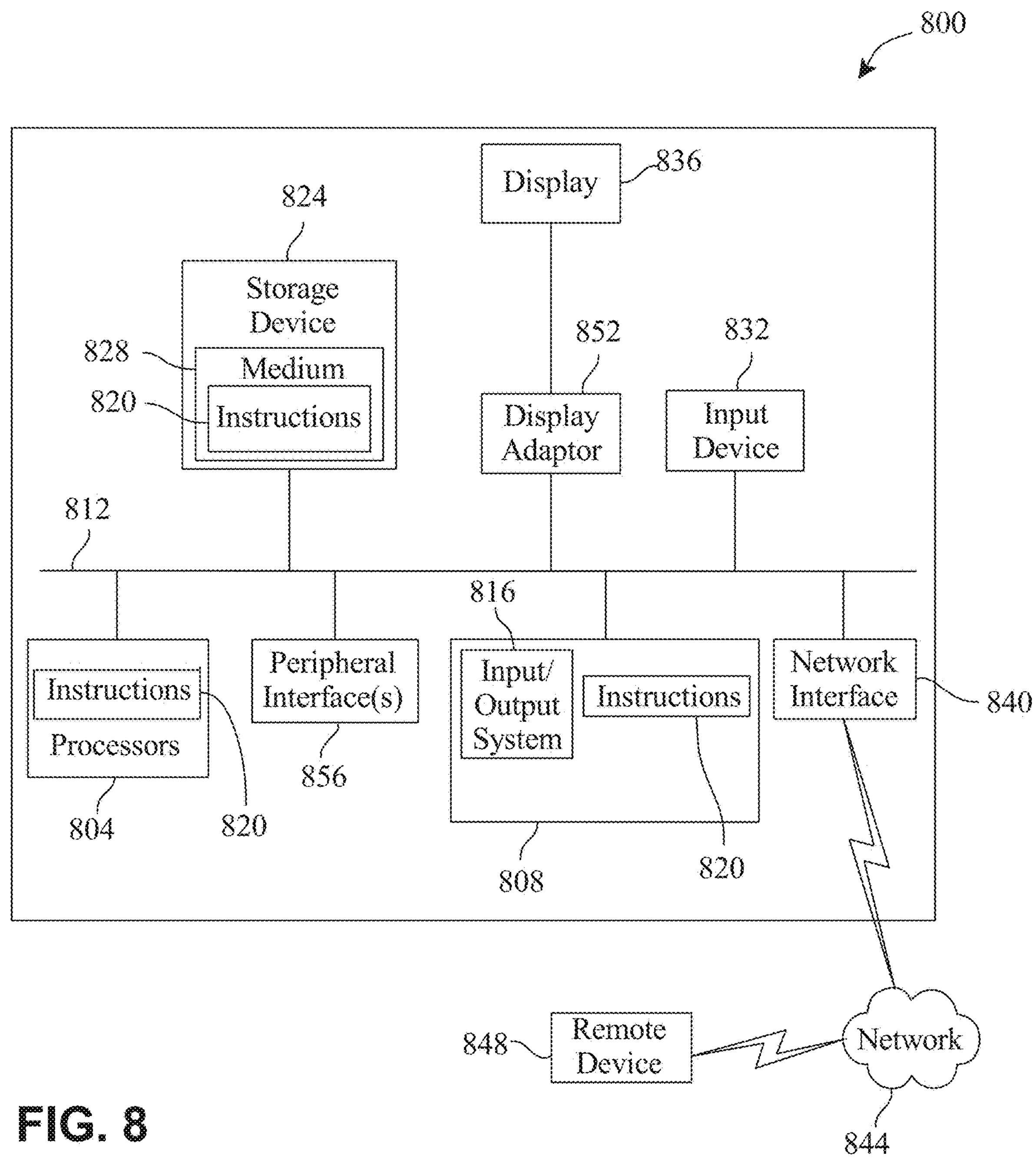
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating a projection structure using a graphical user interface, wherein the system comprises:

a display device, wherein the display device is configured to display a graphical user interface (GUI);

at least a computing device, wherein the computing device comprises:

a memory; and at least a processor communicatively connected to the memory, wherein the memory contains instructions configuring the at least a processor to:

receive, using the at least a processor, a plurality of datasets, wherein each dataset of the plurality of datasets comprises a corresponding plurality of parameters;

generate, using the at least a processor, a first projection structure as a function of the plurality of datasets;

display, through the display device, the first projection structure through the graphical user interface;

receive, through the graphical user interface, natural language query data corresponding to the first projection structure using a chatbot interface presented through the graphical user interface;

generate, using the at least a processor, response data as a function of the natural language query data, wherein generating the response data comprises:

processing, using a large language model, the natural language query data to determine a plurality of data categorizations;

mapping each of the plurality of data categorizations to a database entry index; and obtaining the response data from a database as a function of each database entry index;

generate, using the at least a processor, an adjusted plurality of parameters as a function of the response data;

generate, using the at least a processor, a second projection structure as a function of the response data and the adjusted plurality of parameters; and display, through the display device, the second projection structure in the graphical user interface.

2. The system of claim 1, wherein generating the second projection structure comprises generating a natural language response as a function of the natural language query data and the response data using a second large language model.

3. The system of claim 1, wherein the at least a processor is configured to generate a visual representation of the first projection structure and the second projection structure, wherein the visual representation comprises an interactive diagrammatic structure.

4. The system of claim 1, wherein mapping each of the plurality of data categorizations to a database entry index comprises a look up table.

5. The system of claim 1, wherein the graphical user interface comprises at least an interactive element configured to adjust the plurality of parameters and the adjusted plurality of parameters.

6. The system of claim 5, wherein the processor is configured to:

receive the at least an interactive element updates;

adjust the plurality of parameters as a function of the received at least an interactive element update; and adjust the plurality of adjusted plurality of parameters as a function of the received at least an interactive element updates.

7. The system of claim 1, wherein the at least a processor is configured to track modifications to the second projection structure, wherein the tracked modifications are used to retrain the large language model.

8. The system of claim 1, wherein displaying the second projection structure comprises displaying at least a second interactive element configured to:

receive, using the at least a processor, system feedback; and generate dynamic updates to the graphical user interface as a function of the system feedback.

9. The system of claim 1, wherein each data categorization further comprises an accuracy score, wherein only categorizations with an accuracy score above a threshold are mapped to the database entry index.

10. The system of claim 1, wherein obtaining the response data from the database comprises performing a ranking algorithm to prioritize each database entry index as a function of the natural language query data.

11. A method for generating a projection structure using a graphical user interface, wherein the method comprises:

receiving, using the at least a processor, a plurality of datasets, wherein each dataset of the plurality of datasets comprises a corresponding plurality of parameters;

generating, using the at least a processor, a first projection structure as a function of the plurality of datasets;

displaying, through a display device, the first projection structure through the graphical user interface;

receiving, through the graphical user interface, natural language query data corresponding to the first projection structure using a chatbot interface presented through the graphical user interface;

generating, using the at least a processor, response data as a function of the natural language query data, wherein generating the response data comprises:

processing, using a large language model, the natural language query data to determine a plurality of data categorizations;

mapping each of the plurality of data categorizations to a database entry index; and obtaining the response data from a database as a function of each database entry index;

generating, using the at least a processor, an adjusted plurality of parameters as a function of the response data;

generating, using the at least a processor, a second projection structure as a function of the response data and the adjusted plurality of parameters; and displaying, through the display device, the second projection structure in the graphical user interface.

12. The method of claim 11, wherein generating the second projection structure comprises generating a natural language response as a function of the natural language query data and the response data using a second large language model.

13. The method of claim 11, further comprising generating, using the at least a processor, a visual representation of the first projection structure and the second projection structure, wherein the visual representation comprises an interactive diagrammatic structure.

14. The method of claim 11, wherein mapping each of the plurality of data categorizations to a database entry index comprises a look up table.

15. The method of claim 11, wherein the graphical user interface comprises at least an interactive element configured to adjust the plurality of parameters and the adjusted plurality of parameters.

16. The method of claim 15, further comprising:

receiving, by the at least a processor, the at least an interactive element updates;

adjusting, by the at least a processor, the plurality of parameters as a function of the received at least an interactive element update; and adjusting, by the at least a processor, the plurality of adjusted plurality of parameters as a function of the received at least an interactive element updates.

17. The method of claim 11, further comprising tracking, by the at least a processor, modifications to the second projection structure, wherein the tracked modifications are used to retrain the large language model.

18. The method of claim 11, wherein displaying the second projection structure comprises displaying at least a second interactive element configured to:

receive, using the at least a processor, method feedback; and generate dynamic updates to the graphical user interface as a function of the method feedback.

19. The method of claim 11, wherein each data categorization further comprises an accuracy score, wherein only categorizations with an accuracy score above a threshold are mapped to the database entry index.

20. The method of claim 11, wherein obtaining the response data from the database comprises performing a ranking algorithm to prioritize each database entry index as a function of the natural language query data.

* * * * *